United States Patent [19]
Wallach et al.

[11] 3,930,232

[45] Dec. 30, 1975

[54] FORMAT INSENSITIVE DIGITAL COMPUTER

[75] Inventors: Steven J. Wallach, Chelmsford; Alan J. Deerfield, Newtonville; Stanley M. Nissen, Reading, all of Mass.

[73] Assignee: Raytheon Company, Lexington, Mass.

[22] Filed: Nov. 23, 1973

[21] Appl. No.: 418,641

[52] U.S. Cl.......... 340/172.5; 235/154; 340/347 DD

[51] Int. Cl.².......................................... H03K 13/00

[58] Field of Search.................. 340/172.5, 347 DD; 235/154, 159

[56] References Cited

UNITED STATES PATENTS

| | | | |
|---|---|---|---|
| 3,037,701 | 6/1962 | Sierra | 235/159 |
| 3,389,379 | 6/1968 | Erickson et al. | 340/172.5 |
| 3,460,095 | 8/1969 | Caroussos | 340/172.5 |
| 3,691,554 | 9/1972 | Marschall | 340/347 DD |
| 3,694,639 | 12/1972 | Deschenes et al. | 235/154 |
| 3,701,893 | 10/1972 | Shimaya et al. | 235/154 |
| 3,742,198 | 6/1973 | Morris | 235/154 |
| 3,828,322 | 8/1974 | DeSandre et al. | 340/172.5 |

*Primary Examiner*—Thomas J. Sloyan
*Attorney, Agent, or Firm*—Philip J. McFarland; Joseph D. Pannone

[57] ABSTRACT

A digital computer wherein data words representing different data types, such as fixed point numbers, floating point numbers of logical statements, are retrieved from memory in any order required during execution of a program and, after conversion to a predetermined format, are applied to an arithmetic unit for processing. To accomplish the conversion, logic circuitry is provided to identify, during execution of a program, the data type of each retrieved data word and to change the format of each such word to the predetermined format for processing in the arithmetic unit. Additional logic circuitry is provided to respond to each data word out of the arithmetic unit to reconvert each such word back into a format for storage in memory.

1 Claim, 9 Drawing Figures

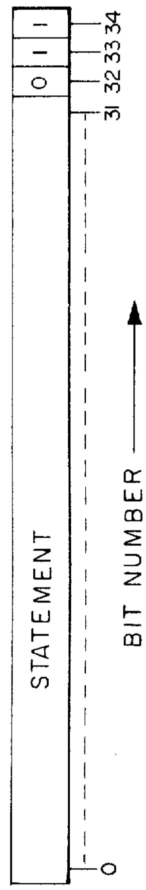
FIG 2A LOGICAL DATA TYPE, OR WORD
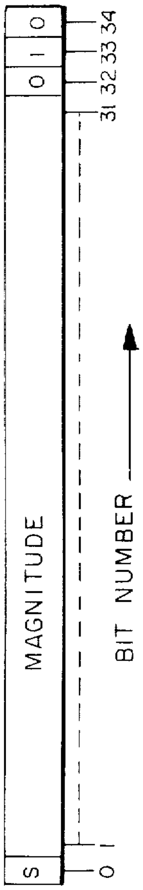
FIG 2B INTEGER DATA TYPE, OR WORD
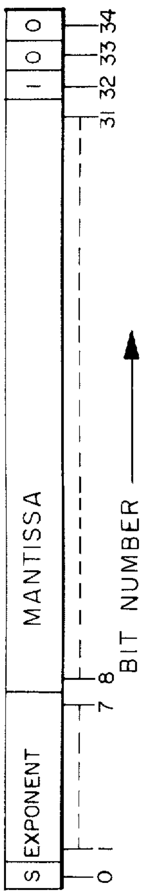
FIG. 2C FLOATING POINT (SINGLE PRECISION) DATA TYPE, OR WORD
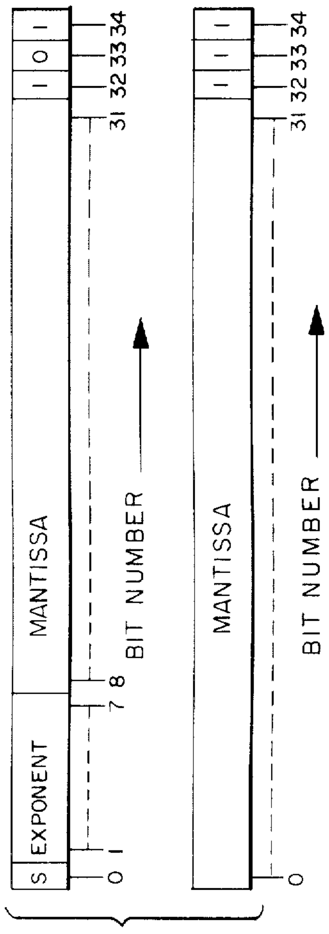
FIG. 2D FLOATING POINT (DOUBLE PRECISION) DATA TYPE, OR WORD
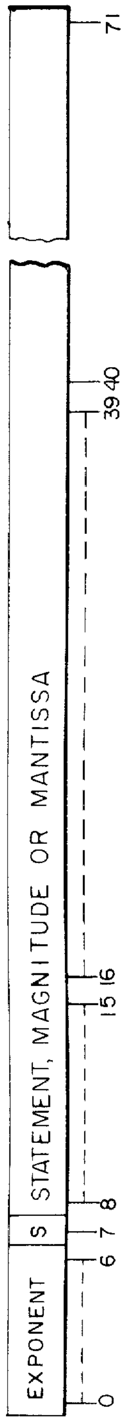
FIG. 2E PROCESSOR DATA TYPE OR WORD

FORMAT INSENSITIVE DIGITAL COMPUTER

The invention herein described was made in the course of or under a contract or subcontract thereunder, with the Department of Defense.

BACKGROUND OF THE INVENTION

This invention pertains generally to digital computers and particularly to the manner in which the format of data in the form of digital words may be processed in such computers.

It is known in the art that provision must be made to distinguish between, and, when necessary, to compensate for differences in the format of data applied to, and removed from, the arithmetic processor in any general purpose digital computer. That is, it is a requisite for proper operation that different data types, e.g. fixed point (or integers), floating point numbers or logical statements, be recognized and that provision be made to process each different data type in a particular and different way. Further, if mixed data types are to be processed, as, for example, fixed point and floating point numbers, additional provision must be made so that only a single data type may be applied to the arithmetic processor at any given time.

Most Higher Order Languages (HOL) used in programming conventional digital computers are such that the procedure operator associated with data in any format is insensitive to format. Thus, for example, the procedure operator "+" may specify "addition" regardless of the data type. Unfortunately, however, the machine language of almost all known digital computers is sensitive to the data format. It follows then that a single procedure operator "+" may not be used to control all addition operations by the arithmetic processor in a general purpose digital computer, but rather different addition operators must be used, depending upon the particular data types being processed.

It is customary to use a compiler to provide the correct procedure operator for each different data type. Thus, as instructions are being converted from a program language to a machine language, data type is determined and the proper machine operator is selected by the compiler. There are, however, two situations in which selection of the proper machine operator becomes difficult and time consuming. In the first situation, when mixed data types are to be processed, it is necessary to introduce a conversion instruction which will cause data words in one of the data types to be changed into the format of the other data type. Thus, an integer (which may be considered to be a kind of fixed point number where the decimal point is assumed to follow the last digit) is usually converted into a floating point number in any one of several known ways. Further, the conversion instruction may apply to the value of the expression thus far computed, or it may apply to the new or next data word in the expression. Still further, the best place to make the conversion must be determined (i.e., several consecutive operators may be integers and could be converted once after combining the data, or they can each individually be converted). The second situation arises when the data word to be used with a given operator is not directly available. If several levels of indirection can occur, or even more dramatically, if the partially computed expression was the result of several branch possibilities, it is necessary for the compiler to trace down all possibilities and determine if, and where, conversion instructions need be applied. When programs are written in a machine language which requires data sensitive operators, or, even more to the point, when conversion instructions are required in the machine procedures, then such programs become permanently data sensitive. Thus, for example, a program which uses an "integer to floating convert" instruction at a particular time must be such that the data word to which such an instruction is to be applied is, in fact, in the format of an integer. It follows, then, that, whenever a machine procedure is to be used with different data types, the program must be rewritten in order to handle the type change.

To reduce the above-mentioned difficulties, it is known to add a tag, representative of data type, to each data word stored in memory in a digital computer and then to control operation of the arithmetic processor in accordance with the tags associated with two successively retrieved data words, in addition to an associated operation code. For most efficient operation, it is necessary that provision be made to "look ahead" so that the tag associated with a particular data word may be sensed and the data word may be converted, if necessary, to a different format before application to the arithmetic processor. Such a "look ahead" capability is, however, difficult to achieve in some cases, as when branch possibilities exist.

SUMMARY OF THE INVENTION

Therefore, it is a primary object of this invention to provide, in a general purpose digital computer, improved format conversion means so that the arithmetic processor in such a computer is adapted to perform any desired operation regardless of the format of any data word retrieved from memory.

Another object of this invention is to provide improved format conversion means in a digital computer adapted to operate on each data word as such word is retrieved from memory during execution of a program without requiring any "look ahead."

Another object of this invention is to provide improved data type conversion means in a digital computer so that a single program is required to process any data type.

Still another object of this invention is to provide an improved data type conversion means so that different data types may be stored in memory and intermixed during processing without introducing error.

A still further object of this invention is to provide improved data conversion means whereby, after processing, data may be stored in memory in a convenient format dictated only by the precision of the result of processing without deleterious effect on execution of any program.

These and other objects of this invention are attained generally by providing, in a digital computer according to this invention, an arithmetic processor adapted to process digital words in a selected format, say a floating point, double precision format, first format conversion means responsive to a format code (sometimes referred to as a "data tag") associated with each stored data word in memory to convert, during retrieval from memory in the execution of a program, each such word to a floating point, double precision format before processing and second format converter means for converting processed data words back into an optimum format for storing in memory and for providing a data tag indicative of such optimum format. At the same time, means are provided for synchronizing operation of the disclosed converters with other parts of a digital computer.

BRIEF DESCRIPTION OF THE DRAWINGS

For a more complete understanding of this invention reference is now made to the following description of the accompanying drawings wherein:

FIGS. 2(A) through 2(D) are examples of the format of digital words typically stored in memory of a digital computer and FIG. 2(E) is an example of the contemplated format of digital words applied to an arithmetic processor in a digital computer;

DESCRIPTION OF THE PREFERRED EMBODIMENT

Figure 1:
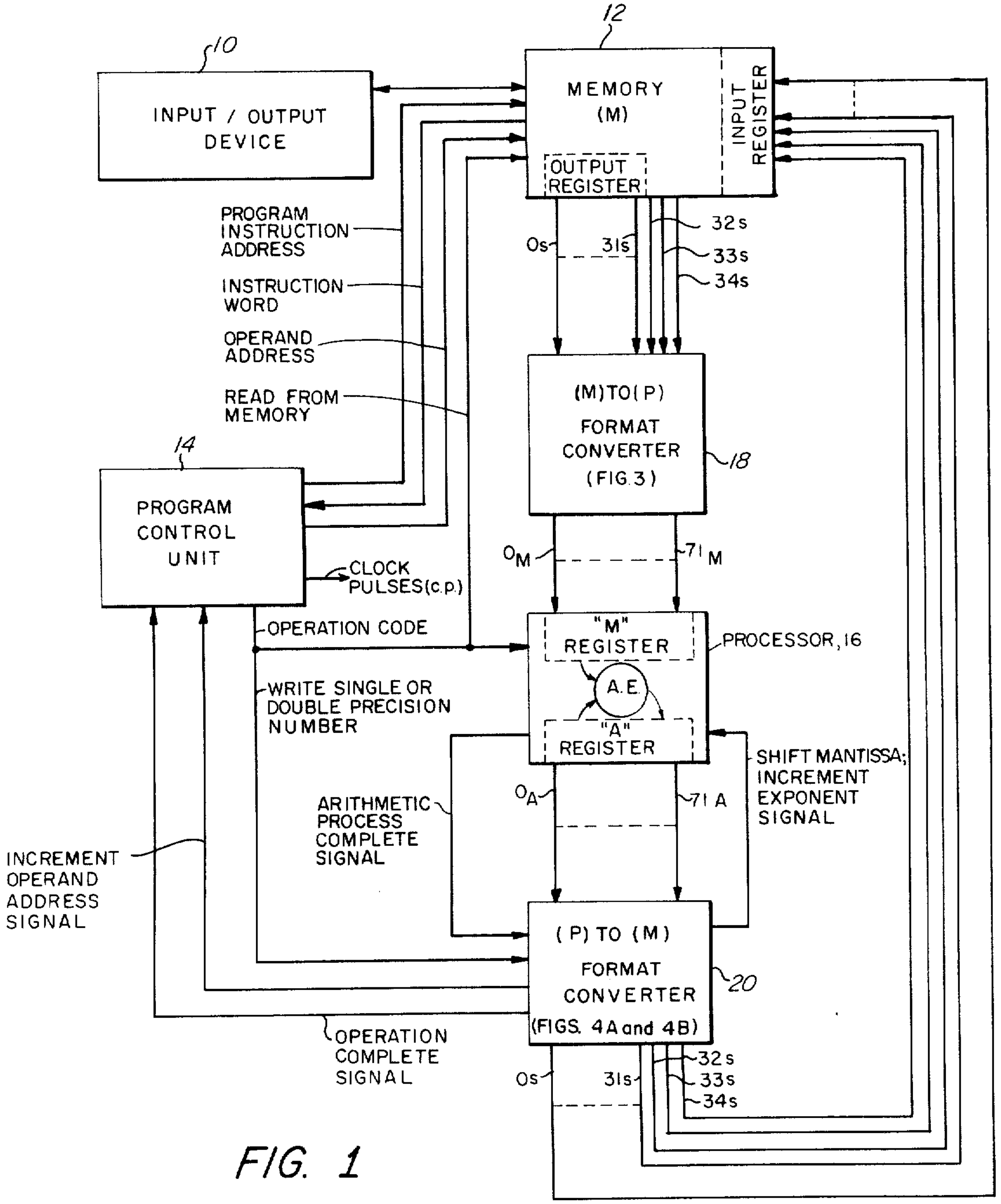
FIG. 1 is a generalized block diagram of a digital computer according to this invention, the diagram showing the location of the contemplated format converters with respect to other major elements of a digital computer.

Referring now to FIG. 1, it may be seen that a digital computer according to this invention is, except for the contemplated format converters to be described, generally organized in a conventional manner. Thus, an input/output device 10, a memory 12, a program control unit 14 and a processor 16 are provided. All of the just-mentioned elements are conventional to permit a program to be executed and need not be described in detail to provide an understanding of the invention.

It should be clearly understood that the various conventional elements just mentioned operate in conventional ways to execute any given program. That is, the input/output device 10 may, as is well known in the art, include elements such as tape readers and encoding apparatus to load the memory 12 with program instructions and data (or operands), such instructions and data being represented as multi-bit digital words at different addresses in the memory 12. It is noted that the encoding apparatus preferably includes, for reasons to be made clear hereinafter, a code indicative of the format of each data word. That is, a field in each multi-bit digital word representing data (or an operand) is reserved for a "data tag" to distinguish between integers, floating point and other formats for data. Instruction words in memory need not have an associated data tag for the reasons that all such words in any digital computer have a single format and are not, in any event, applied to the processor.

The memory 12 may be of any known type used in digital computers. In the following explanation of an embodiment of the invention it is assumed that a 36 bit digital word may be stored at each address in the memory 12. Any such digital word representing data includes the following three fields: (*a*) a parity code field (one bit); (*b*) a data word code field (32 bits); and a data tag code field (three bits). The parity code is conventional and will not be discussed hereinafter. The data word code may take any one of up to eight different formats (with a three bit data tag). That is, for example, data words may be expressed as "signed" numbers such as a fixed point number (either an integer or a fraction), a floating point number of a complex number or an unsigned number such as a logical statement. Further, the data tag may, in addition, distinguish between single precision and double precision numbers. The latter data type is formed from two 36 bit digital words (usually at adjacent addresses in memory), the first being similar in format to the floating point, single precision number and the second being similar in format to a logical statement. The data tags associated with the two parts of the double precision number then distinguish them from, respectively, a single precision number and a logical statement. The memory 12 also, as is conventional, has input and output buffer registers for temporary storage of each multi-bit digital word read out of, or written into, memory.

The program control unit 14 (sometimes referred to in the art as a "fetch" unit) serves to direct and synchronize operation of the input/output device 10, the memory 12 and the processor 16 in a conventional manner. Thus the program control unit 14 contains conventional components, such as a clock generator, a program counter and an instruction register, none of which are shown because of their conventional nature. The clock generator provides, wherever required, synchronizing pulses; the program counter provides program instruction addresses in memory as any program is being executed; and the instruction register provides a buffer store for instruction words retrieved from memory. Each instruction word contains at least an operation code field and an operand address field. In the illustrated example, wherein only double precision numbers are processed, one bit in the operation code field is dedicated to providing an indication of the degree of precision of the numbers to be stored. Thus, if that dedicated bit is a logical zero it is here deemed to be an indication that a single precision number is to be stored and, if that dedicated bit is a logical one, a double precision number. The remaining bits in the operation code field then provide, as desired during execution of any program, requisite control signals for the other elements of the illustrated computer. That is, commands such as "read out of memory," "write into memory" or "compute" (however such commands are designated in any particular program language) are provided by the operation code in machine language to the remaining elements.

In addition to the enumerated conventional elements, a digital computer according to this invention includes an "(M) to (P) format converter" 18 and a "(P) to (M) format converter" 20. Diagrams of exemplary embodiments of the two just mentioned elements are shown, respectively, in FIGS. 3 and 4. Suffice it to say here that the former format converter, in response to the data tag associated with each operand extracted from memory during execution of a program, changes (if required) the format of each number read out of memory to a floating point, double precision number in a conventional processor input register, M, in the processor 16. Because, for reasons to be set forth hereinafter, the number of bits in the digital word applied to the processor 16 is usually greater than the number of bits in the operand as retrieved from memory, the (M) to (P) format converter 18 may sometimes be referred to as a "fan out" box.

It will be recognized that, because the numbers read out of memory are converted to a floating point, double precision format before any processing, operation of the processor 16 is unaffected by the format of any operand in memory. Thus, any known arithmetic unit (A.E.) may be incorporated in the processor 16. For example, the "Floating Point Multiplier" shown and described in U.S. Pat. No. 3,725,649, Alan J. Deerfield, inventor, (issued Apr. 3, 1973 and assigned to the assignee of this application) may be used as the arithmetic element in the processor 16 if a "multiply" operation is desired.

Referring now to FIGS. 2(A) through 2(D), it may be seen that four possible formats for digital words in memory (sometimes referred to as "memory words") have been shown. Thus, a logical statement as shown in FIG. 2(A) may be expressed as a 32 bit data word occupying the 0th to the 31st bits of a 35 bit memory word with the last three bits (here 011) being a data tag to identify the word as a logical statement. It should be noted that a logical statement may be considered to be an unsigned integer. An integer, meaning a fixed point number with the decimal point assumed always to be after the least significant bit, may be, as shown in FIG. 2(B), expressed as a 35 bit memory word with a sign in the 0th bit, a 31 bit data word and a three bit data tag (here 010). A floating point, single precision number may be expressed as a 35 bit memory word with a sign in the 0th bit, an exponent in bits 1 through 7, a mantissa in bits 8 through 31, followed again by a three bit data tag (here 100). A floating point, double precision number, which occupies two addresses in memory, may be represented by a first portion, similar to a floating point, single precision number but with a different data tag (here 101) and a second portion expressed as a 35 bit memory word with a 32 bit data word followed by a data tag (here 111).

With a 72 bit word in the processor 16, it may be seen that the format of any data word from memory may be accommodated by the "processor word" as shown in FIG. 2(E). Thus, the 0th to 6th bits in the processor words may be dedicated to exponents, the 7th bit to signs, and the remaining bits to magnitudes, or mantissas. If the original format of the data word from memory [as with either a logical statement, FIG. 2(A), or an integer, FIG. 2(B)], contains no explicit exponent, the 0th to 6th bits of the processor word are "zeros," with the 7th bit a "zero" for a logical statement and the 8th bit a "zero" for an integer, and if the original format [as with either type of floating point number, FIG. 2(C) or FIG. 2(D)] contains a mantissa, the 8th through the 15th bits in the processor word are, in the first instance, "zeros."

Figure 3:
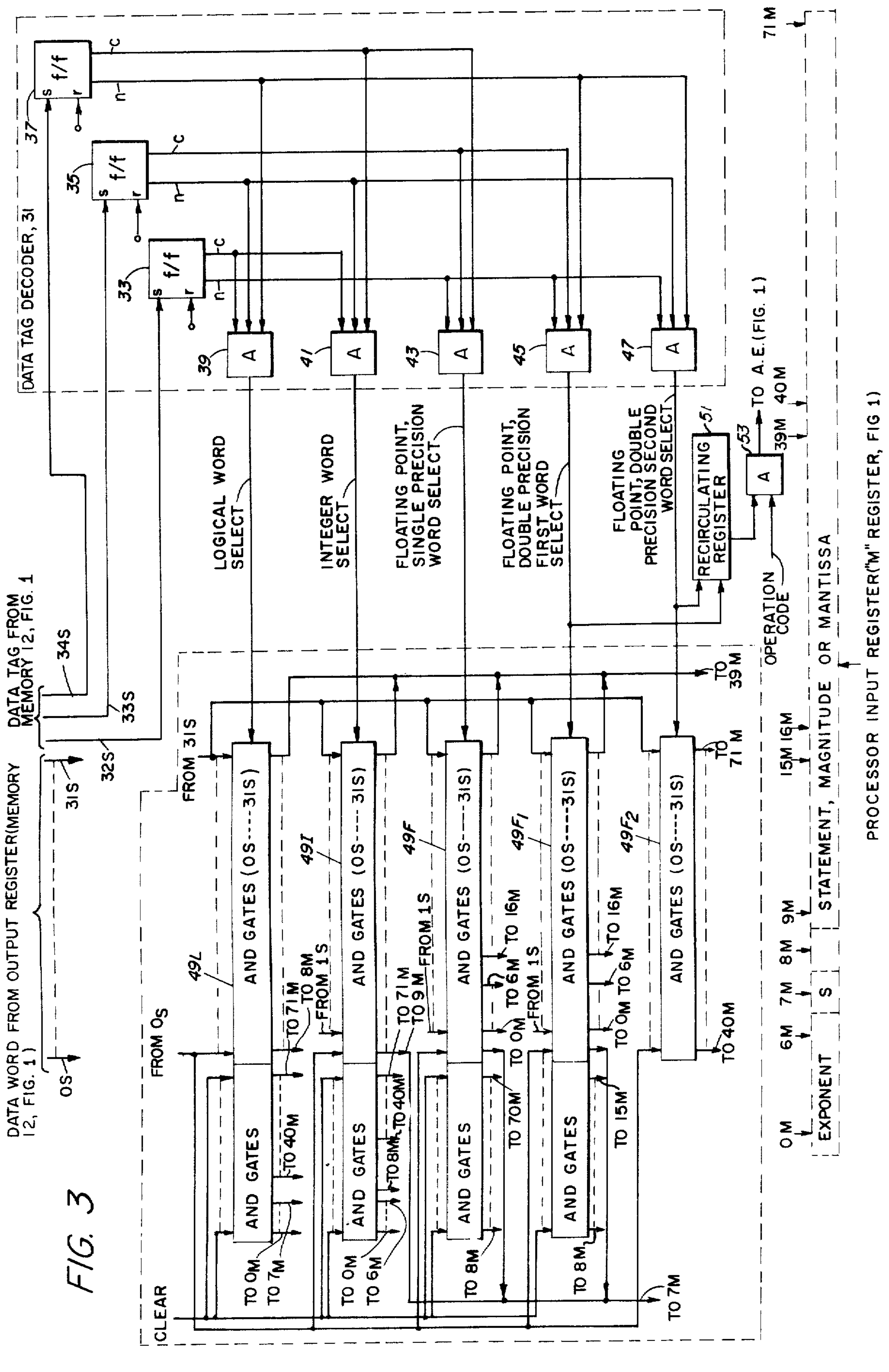
FIG. 3 is a block diagram illustrating a way in which digital words in any of the formats shown in FIGS. 2(A) through 2(D) may be converted to the format shown in FIG. 2(E)

Referring now to FIG. 3, it may be seen that, as each data word (meaning operand) is retrieved from the memory 12 during execution of a program, such word is loaded into an output buffer register (not numbered in FIG. 1) and the associated data tag associated with each retrieved memory word is applied to a data tag decoder 31. This element is conventional, here being shown as containing three flipflops 33, 35, 37 and five AND gate matrices 39, 41, 43, 45, 47. It is noted here that the three flipflops 33, 35, 37 may be considered to be stages in the output buffer register of the memory 12 (FIG. 1). After each clock pulse, c.p., resets flipflops 33, 35, 37 the then existing data tag associated with the data word being retrieved from the memory 12 selectively sets different ones of such flipflops. In consequence, then, a logic one is present at the output of one of the AND gate matrices 39, 41, 43, 45, 47 to enable an associated one of a set of AND gates 49L, 49I, 49F, 49F1, 49F2. The second input to each one of the just-mentioned gates is a different one of the bits making up the data word from the memory 12. The outputs of each set of AND gates 49L, 49I, 49F, 49F1, 49F2 are connected to different stages of the processor input register, designated the "M" register in FIG. 1. When two digital words are to be retrieved from memory, i.e., when a double precision number is to be processed, it is usually necessary to retrieve both words from memory before execution of an operation is begun. Thus, when a logic one is produced by AND gate 45, such a signal also causes a logic one to be shifted from stage one of a two stage recirculating register 51, thereby then inhibiting an AND gate 53 to prevent an operation code from then being applied to the arithmetic element in the processor 16 (FIG. 1). When a logic one appears at the output of AND gate matrix 47, i.e., when the second portion of the double precision word to be processed has been loaded into the processor input register, the logic one in recirculating register 51 is shifted back to stage one thereof, thereby enabling AND gate 53 to permit the operation code to be applied to the arithmetic element (FIG. 1).

It will now be observed that, regardless of the format of the data word, or operand, retrieved from the memory 12, there is but a single format for any word in the processor input register, M. Thus, stages 0M through 6M of that register contain any explicit exponent or, if there is no explicit exponent in the retrieved data word, or operand, only logical zeros; stage 7M contains a sign code (either a logical one or a logical zero if the data word, or operand, has a sign) or, if a logical statement is to be processed, a logical zero; stages 8M through 39M contain the significant bits of the data word, or operand, except that in the case of a floating point number stages 8M through 15M are logical zeros and, in the case of an integer, stage 8M contains a logical zero; and stages 40M through 71M contain the significant bits of the second word making up a double precision number, or if no double precision number is to be processed, stages 40M through 71M are all logical zeros. The contents of the processor input register may be processed as though only a floating point, double precision number had been retrieved from the memory 12, all forced logical zeros having no algebraic effect on processing and a logical statement being treated as an integer with a positive sign.

Figure 4A:
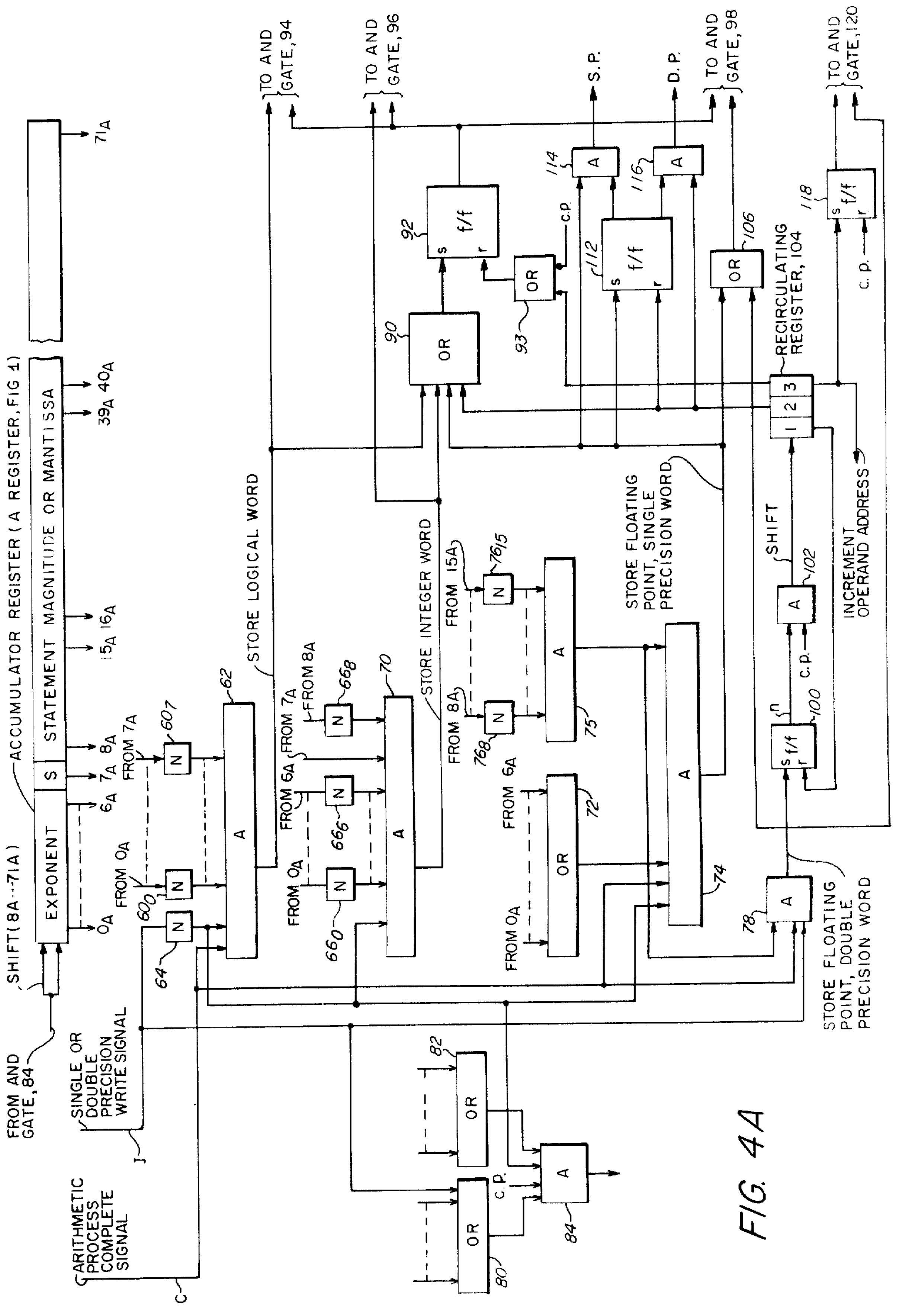
FIGS. 4A and 4B, taken together as a unit, is a block diagram illustrating a way in which digital words in the format shown in FIG. 2(E) may be converted to one of the formats shown in FIGS. 2(A) through 2(D).
Figure 4B:
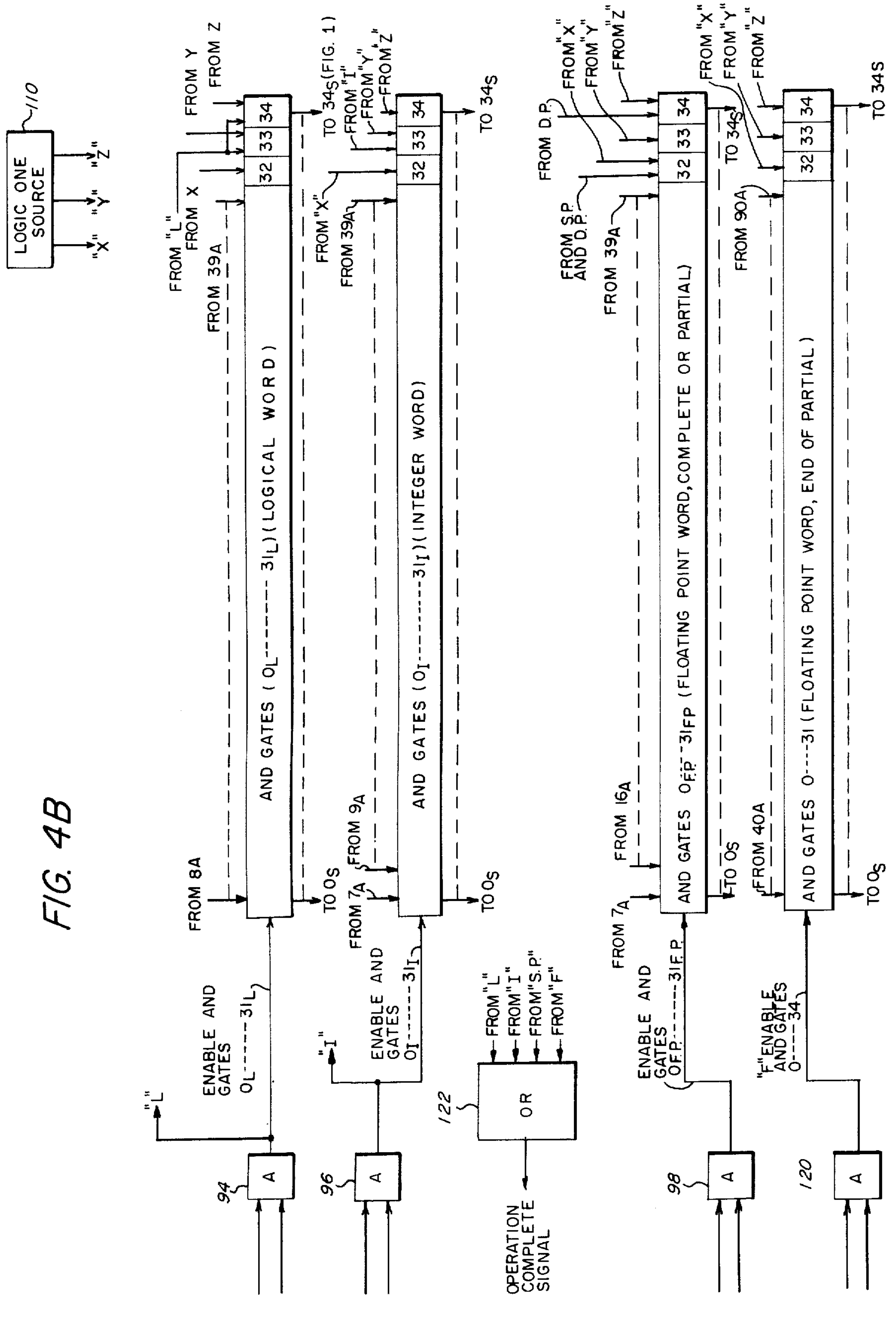

Referring now to FIG. 4, it will be observed that, at the completion of each arithmetic process, the accumulator register in the illustrated processor 16 (FIG. 1) will contain a 72 bit number which, in toto, represents a floating point, double precision number. Different known fields in the number in the accumulator register, however, contain only logical zeros, so the 72 bit number in the accumulator register may advantageously be converted into one, or two, 35 bit memory words returned to the memory 12 (FIG. 1). Thus, a logical statement is present when the $\mathbf{0}_A$th through the $\mathbf{6}_A$th, the $\mathbf{7}_A$th and the $\mathbf{40}_A$th through the $\mathbf{71}_A$st stages are all logical zeros; an integer is present when the $\mathbf{0}_A$th through the $\mathbf{6}_A$th, the $\mathbf{8}_A$th and the $\mathbf{40}_A$th through the $\mathbf{71}_A$st stages are all logical zeros; a floating point single precision number is present when a logic one is in any of the $\mathbf{0}_A$th through the $\mathbf{6}_A$th stage, and the $\mathbf{8}_A$th through the $\mathbf{15}_A$th and the $\mathbf{40}_A$th through the $\mathbf{71}_A$st stages are all logical zeros. All of these formats may be expressed as a 32 bit data word and may, therefore, be returned to memory as a single word, provided an appropriate data tag is also returned to memory.

With the foregoing in mind, it may be seen that (P) to (M) format converter 20 (FIG. 1) here consists of five different condition sensors actuated in accordance with the condition of different stages of the accumulator register. These condition sensors, in turn, determine which formats will be used when the contents of the accumulator register are returned to memory through an input buffer register (not numbered in FIG. 1). Thus, the $\mathbf{0}_A$th through the $\mathbf{7}_A$th stages of the accumulator register are fed (through inverters $\mathbf{60}_0$.....$\mathbf{60}_7$) to an AND gate matrix 62 along with a conventional "process complete" signal from the processor 16 (FIG. 1) and a signal indicating a single precision word. The latter here is conveniently derived from a logical zero in a dedicated bit in the operation code applied to the processor. Such a logical zero is changed to a logical one by an inverter 64. It will be noted that such a logical one is the equivalent of all logical zeros in the $\mathbf{40}_A$th through $\mathbf{71}_A$st stages of the accumulator register. A logical one at the output of the AND gate matrix 62 then may be taken to be a command signal to " store a logical word in memory."

A second format, i.e., an integer, is here sensed by passing the outputs of the $\mathbf{0}_A$th......$\mathbf{6}_A$th stages of the accumulator register through inverters $\mathbf{66}_0$.....$\mathbf{66}_6$, along with the output of the $\mathbf{8}_A$th stage through an inverter $\mathbf{66}_8$, to an AND gate matrix 70, with the $\mathbf{7}_A$th stage fed directly. With a "process complete" and a "single precision" signal also applied to AND gate matrix 70, a logical one at the output of that matrix may be taken as a command signal to "store an integer" in memory.

A third format, i.e., a floating point, single precision number is here sensed by passing the outputs of the $\mathbf{0}_A$th through the $\mathbf{6}_A$th stages of the accumulator register through an OR gate matrix 72 to an AND gate matrix 74. The latter also is fed by the output of an AND gate matrix 75 which produces a logical one when the contents of the $\mathbf{8}_A$th through the $\mathbf{15}_A$th stages (inverted by inverters $\mathbf{76}_8$.....$\mathbf{76}_{15}$) are all logical zeros. With a "single precision" and "process complete" signal also applied to the AND gate matrix 74, a logical one at the output of that matrix may be taken to be a command signal to "store a floating point, single precision number" in memory.

A fourth format, i.e., a floating point, double precision number, is similar to the third format in that the outputs of the $\mathbf{8}_A$th through the $\mathbf{15}_A$th stages (inverted) of the accumulator register are fed through the AND gate matrix 75. The signal from the just-mentioned matrix is, however, fed to an AND gate matrix 78 which is also fed by a "process complete" signal and a "double precision" signal, the latter being a logical one in the dedicated field of the operation code. The output of the AND gate matrix 78 may then be taken as a command signal to "store a double precision word" in memory.

It should be noted from the foregoing that, at the time a "process complete" signal occurs, one, and only one, of the AND gate matrices 62, 70, 74, 78 is fully enabled, provided the 72 bit word in the accumulator register permits one of such matrices to be enabled. When the $\mathbf{0}_A$th through $\mathbf{6}_A$th stage of the accumulator register contains a logical one, or a "double precision" signal is present, (indicating that the format of the number in the accumulator is "floating point") and there is a logical one in one or more of stages $\mathbf{8}_A$th through $\mathbf{15}_A$th, neither AND gate matrix 74 nor AND gate matrix 78 may produce a "store" command signal as described above. This is so because the presence of a logical one in the $\mathbf{8}_A$th to the $\mathbf{15}_A$th stage of the accumulator register indicates that the format of the word in the accumulator register must be adjusted. To make such adjustment it is necessary to shift the mantissa portion of the floating point number stored in the accumulator register until the contents of the $\mathbf{8}_A$th through the $\mathbf{15}_A$th stages are all logical zeros, and to change the exponent by incrementing the number in the $\mathbf{0}_A$th to $\mathbf{6}_A$th stages by one for each place the mantissa is shifted. Alternatively, if the contents of the $\mathbf{8}_A$th through $\mathbf{12}_A$th stages of the accumulator register are logical zeros and the exponent is +1 in the accumulator register, the mantissa is shifted left 4 stages and the exponent decremented. To sense an "improper" mantissa in the accumulator register, the $\mathbf{0}_A$th through $\mathbf{6}_A$th, the $\mathbf{8}_A$th through $\mathbf{15}_A$th stages, and the "double precision" signal are fed through OR gate matrices 80, 82 to an AND gate matrix 84. When the latter is enabled by OR gate matrices 80, 82 and a "process complete" signal is also applied, clock pulses c.p. may pass through AND gate matrix 84 to shift the mantissa portion right or left until the $\mathbf{8}_A$th through the $\mathbf{15}_A$th stages of the accumulator register are all logical zeros and to adjust the exponent in the $\mathbf{0}_A$th to $\mathbf{6}_A$th stages. It will be noted in passing that, if a single precision number is to be stored, the correction process may result in all logical zeros being detected in the $\mathbf{0}_A$th to $\mathbf{6}_A$th stages while a logical one is present in the $\mathbf{9}_A$th through the $\mathbf{15}_A$th stages. This means that the format of the number in the accumulator register is that of an integer. That is, AND gate matrix 70 is enabled, thereby producing a "store integer" command. It will also be noted that the number of stages the mantissa portion is shifted by each clock pulse, c.p., through AND gate matrix 84 may be varied from one through eight stages, provided the exponent is adjusted accordingly.

From the foregoing it may now be seen that the contents of the accumulator register (along with a signal distinguishing between single and double precision words) determine which one of four command signals are generated when any arithmetic process is completed. The first three of such command signals ("store logical word," "store integer" and "store floating point, single precision word") require that the format of the word in the accumulator register be changed to a single word to be transferred to memory. The fourth command signal ("store floating point, double precision word") requires that the format of the word in the accumulator register be changed to two words to be transferred to memory. Further, all words transferred to memory must include a data tag.

To accomplish the foregoing, the output signals of AND gate matrices 62, 70, 74 are passed through an OR gate matrix 90 to the "set" terminal of a flipflop 92. Clock pulses, c.p., are applied to the "reset" terminal of the latter. The output of the AND gate matrix 78 also may cause the flipflop 92 to be set through operation of a flipflop 100 (set by a logical one out of AND gate matrix 78), an AND gate 102 (enabled by the flipflop 100 to pass clock pulses, c.p.) and a recirculating register 104. When a logic one is in the second stage, flipflop 92 is set. The flipflop 92 is reset, through an OR gate 93 by either the next following clock pulse, c.p., or a logical one in stage 3 of the recirculating register 104.

The second input to AND gate 94 is a logic one when the "store logical word" command is present; the second input to AND gate 96 is a logic one when the "store integer" command is present; and, by reason of an OR gate 106 connected to the outputs of AND gate matrices 74, 78, the second input to AND gate 98 is a logic one when either the "store floating point, single precision word" or the "store floating point, double precision word" command is present. As noted hereinbefore, flipflop 92 is set when a logical one is in the second stage of the recirculating register 104 and reset when such logical one is shifted to the third stage of that recirculating register. That is to say, when a "store floating point, double precision word" command is present AND gate 98 is enabled only during the time interval required to transfer the first of two words making up a double precision word in memory.

When the output of AND gate 94 is a logical one, AND gates $0_L$.....$31_L$, $33_L$ and $34_L$ are enabled. The second input to AND gates $33_L$ and $34_L$ are logical ones from any convenient logical one source 110, as a DC source. The outputs of AND gates $0_L$.....$34_L$, therefore, make up a logical statement with an appropriate data tag (here 011), in the format of a word in memory.

When the output of AND gate 96 is a logical one, AND gates $0_I$.....$31_I$ and $33_I$ are enabled. The second input to AND gate $0_I$ is taken from stage $7_A$ of the accumulator register, the second inputs to AND gates $1_I$.....$31_I$ are taken from stages $9_A$.....$39_A$ of the accumulator register and the second input to AND gate $33_I$ is taken from the logical one source 110. The outputs of the AND gates $0_I$.....$34_I$, therefore, are in the format of an integer with an appropriate data tag (here 010) completing the format of a word for writing in memory.

When AND gate 98 is enabled, either a complete floating point, single precision word or the first part of a floating point, double precision word is converted from the format of the accumulator register to the format required for a word in memory. Thus, a logical one out of AND gate 98 enables AND gates $0_{F.P.}$.....$31_{F.P.}$. The second inputs to AND gates $0_{F.P.}$.....$7_{F.P.}$ are taken from stages 7A and $0_A$.....$6_A$ of the accumulator register and the second inputs to AND gates $8_{F.P.}$.....$31_{F.P.}$ are taken from stages $16_A$.....$39_A$ of the accumulator register. Thus the sign, exponent and a complete mantissa (if a single precision number is to be transferred to memory) or the sign, exponent and a part of the mantissa (if a double precision number is to be transferred to memory) are passed through AND gates $0_{F.P.}$.....$31_{F.P.}$ in the format required by the memory. To distinguish between a single precision and a double precision number, AND gates $32_{F.P.}$, $33_{F.P.}$ and $34_{F.P.}$ are controlled by causing the "store floating point, single precision word" command out of AND gate matrix 74 to set a flipflop 112 and the "store floating point, double precision word" command to reset that flipflop. In consequence, AND gate 114 or AND gate 116 is enabled. With AND gate 114 enabled, the "store floating point, single precision" command causes AND gate $32_{F.P.}$ to be enabled to produce the data tag 100; with AND gate 116 enabled, the "store floating point, double precision word" command AND gates $32_{F.P.}$ and $34_{F.P.}$ are enabled to produce the data tag 101.

With a "store floating point, double precision word" command existing, the second clock pulse, c.p., through AND gate 102 causes the logical one in the recirculating register 104 to be shifted to stage 3 thereof. When a logical one is in stage 3 of the recirculating register 104, flipflop 92 is reset (to inhibit AND gate 98) and a flipflop 118 is set to enable an AND gate 120. At the same time an "increment operand address" signal is passed to the program instruction unit 14 (FIG. 1) to increment the operand address in a conventional manner. The second input to AND gate 120 is the "store floating point, double precision word" command from AND gate matrix 78. The resulting logical one out of AND gate 120 enables AND gates 0.....34. The second inputs to AND gates 0.....31 are taken from stages $40_A$.....$71_A$ of the accumulator register and the second inputs to AND gates 32, 33, 34 are taken from the logical one source 110. Thus, a word in format for storing in memory is produced, such word consisting of 32 bits for data and a data tag of 111.

The outputs of AND gates $0_L$.....$34_L$; $0_I$.....$34_I$; $0_{F.P.}$.....$34_{F.P.}$; and 0.....34 are passed through OR gates (not shown) to the input buffer register in the memory 12 (FIG. 1)).

The completion of any of the conversion processes, i.e., the conversion of a word in the format of the accumulator register to the format required by memory, is signalled to the program control unit 14 (FIG. 1) by passing the outputs of AND gates 94, 96, 114, 120 through an OR gate matrix 122. Such a completion signal, then, causes the program control unit 14 to continue, in a conventional way, execution of the program.

It will now be clear that our concept of providing format converters of the disclosed type (or any equivalent) between the memory and the processor results in a digital computer which accomplishes the recited objects of our invention with a concomitant improvement in operation. Specifically, it will be clear that our (M) to (P) converter: (*a*) eliminates any requirement to "look ahead" during execution of a program to determine the format of any data word retrieved from memory; (*b*) eliminates any requirement that any program be rewritten to provide for differences in data types in memory; and (*c*) permits different data types to be stored in memory. Further, our contemplated processor and our (P) to (M) converter may be seen to be particularly well adapted to multiplication of floating point numbers by reason of the fact that the number of "overflows" of mantissa products during processing is reduced. That is, because stages $8_A$ through $15_A$ of the accumulator register in our disclosed processor initially contain logical zeros when a "floating point multiply" operation is to be executed, such stages may be used as such an operation is being executed as part of a register to store mantissa products. This, in turn, means that any mantissa product (which otherwise would overflow the original field, i.e., stages $16_A$.....$39_A$, in the accumulator register) need not be truncated during a "multiply" operation unless such product overflows stage $8_A$. It follows then, also, that the exponent need not be incremented during execution of a "multiply" operation unless the mantissa product overflows stage $8_A$. This feature, it will be observed, ordinarily increases the overall speed of execution of a "floating point multiply" operation and, at the same time, increases the precision of the result because truncation usually need only be accomplished after the operation is complete.

Having described an embodiment of our invention whereby an original format of digital words in memory may be automatically converted, during execution of a program, to a different format for processing and then may be reconverted back to a format (which may differ from the original format) for storage in memory, it will be apparent to one of skill in the art that many changes may be made without departing from our inventive concepts. For example, in the block diagrams of FIGS. 3 and 4, it is obvious that many of the AND gates may be combined to reduce the number of components required in a working computer. Thus, in FIG. 3, for example, AND gates 16S.....31S of the AND gates referenced as 49L, 49I, 49F and 49F$_1$ could be combined into one subset of AND gates enabled by either the logic word; integer; floating point, single precision word; or floating point, double precision, first word select lines. Similarly, in FIG. 3, AND gates $\mathbf{16}_L$.....$\mathbf{31}_L$; $\mathbf{16}_I$.....$\mathbf{31}_I$; and AND gates $\mathbf{16}_{F.P.}$.....$\mathbf{31}_{F.P.}$ could be combined. Further, it will be recognized that with a three bit data tag, it would be possible to provide both an (M) to (P) converter and a (P) to (M) converter which could automatically operate on up to eight different formats rather than the four formats as shown. That is, it is contemplated that other more or less commonly used formats, such as those of complex numbers or fractions, may be converted from a "most efficient" format in memory to a "most efficient" format in a processor, and vice versa. Further, it is evident that the lengths of the words, i.e., the number of bits in a word in memory and the number of bits in a word in the processor may be varied.

Still further, it will be evident that the positive logic herein assumed for expository reasons need not be used, it being obviously possible to use negative or mixed logic to reduce the number of components required. Finally, it will be recognized that, because the format of data words returned to memory after processing may differ from the format of data words originally loaded into memory by the input/output device, the latter (when used as an output device) should also be capable of distinguishing between data types.

It is felt, therefore, that this invention should not be restricted to its disclosed embodiment, but rather should be limited only by the spirit and scope of the appended claims.

What is claimed is:

1. In a digital computer including a memory wherein single precision words may be stored at respective single memory locations and double precision words may be stored at two contiguous memory locations as two single precision words, each one of such words, other than instruction words, including an "*m*" bit operand code field, where "*m*" is the number of bits making up an operand code in any one of a plurality of formats including logical statements, fixed point numbers, floating point single precision numbers and floating point double precision numbers and an "*n*" bit data type code indicative of the format of the operand, and a processor wherein each operand retrieved from the memory during execution of a program may be processed, the improvement comprising a. a plurality, corresponding in number to the number of different formats of operands, of first format conversion means for changing the format of each single precision word retrieved from the memory during execution of a program, each different one of such first format conversion means being actuated by a different one of the data type codes in each single precision word to convert each operand retrieved from the memory to a particular format of a floating point, double precision word of $2[m + n]$ bits and to combine the two single precision words making up each double precision word retrieved from the memory into said particular format, the states of selected bits in each said particular format floating point double precision word being indicative of the data type code corresponding to each operand retrieved from the memory;

b. means, responsive to each said particular format floating point, double precision word for processing each such word, the states of the selected bits remaining unchanged during processing; and c. a plurality, corresponding in number to the number of different formats of operands, of second format conversion means, each different one of such second format conversion means being responsive to the states of the selected bits in each one of said particular format floating point, double precision words out of the processing means to convert each such one to a format corresponding to the original format of the single or double precision words stored in the memory in single or two contiguous memory locations, respectively.

* * * * *